(12) United States Patent
Lui et al.

(10) Patent No.: US 7,107,690 B2
(45) Date of Patent: Sep. 19, 2006

(54) ELECTRIC CUTTING TOOL

(75) Inventors: Tat Nin Lui, Hong Kong (HK); Hong Sheng Xu, Shenzhen (CN)

(73) Assignee: Choon Nang Electrical Appliance Mfy., Ltd., Aberdeen (HK)

( * ) Notice: Subject to any disclaimer, the term of this patent is extended or adjusted under 35 U.S.C. 154(b) by 180 days.

(21) Appl. No.: 10/851,065

(22) Filed: May 24, 2004

(65) Prior Publication Data

US 2005/0257382 A1    Nov. 24, 2005

(51) Int. Cl.
*B27B 19/09* (2006.01)
(52) U.S. Cl. ............................ 30/392; 30/337; 279/71; 279/81; 279/905
(58) Field of Classification Search ................. 30/392, 30/337, 338, 339; 279/71, 74, 75, 76, 78–81, 279/905
See application file for complete search history.

(56) References Cited

U.S. PATENT DOCUMENTS

| | | | | |
|---|---|---|---|---|
| 2,467,569 A | * | 4/1949 | Walters | ........................ 279/50 |
| 4,106,181 A | | 8/1978 | Mattchen | |
| 4,557,337 A | * | 12/1985 | Shibata | ....................... 173/93.5 |
| 5,333,523 A | | 8/1994 | Palm | |
| 5,487,221 A | | 1/1996 | Oda et al. | |
| 5,575,071 A | | 11/1996 | Phillips et al. | |
| 5,601,380 A | | 2/1997 | Guthrie et al. | |
| 5,903,983 A | | 5/1999 | Jungmann et al. | |
| 6,276,065 B1 | | 8/2001 | Osada et al. | |
| 6,638,290 B1 | | 10/2003 | Pascaloff et al. | |
| 6,688,610 B1 | * | 2/2004 | Huggins et al. | ............... 279/22 |
| 2004/0098870 A1 | * | 5/2004 | Nemazi et al. | ............... 30/392 |
| 2005/0132584 A1 | * | 6/2005 | Cornwell et al. | ............. 30/392 |

FOREIGN PATENT DOCUMENTS

DE    199 51 040    10/1999
JP    2002-52418    2/2002

* cited by examiner

*Primary Examiner*—Stephen Choi
(74) *Attorney, Agent, or Firm*—Leydig, Voit & Mayer, Ltd.

(57) ABSTRACT

An electric cutting tool has a body, a chuck at an end of the body for attaching a cutting implement having a rear end including a recess, and a drive mechanism for driving the chuck to slide in reciprocation for operating the cutting implement. The chuck has a gap for receiving the rear end of the implement, an internal multi-part fixing mechanism for engaging the recess of the cutting implement in the gap, and an outer cylinder having an inner cam surface for acting upon the fixing mechanism. The cylinder is manually rotatable between a locked position in which the cam surface presses the fixing mechanism tight against the recess in the gap to fix the cutting implement in place and an unlocked position in which the fixing means is released from the cutting mechanism. The fixing mechanism includes two discrete balls.

13 Claims, 5 Drawing Sheets

ELECTRIC CUTTING TOOL

The present invention relates to an electric cutting tool and particularly but not exclusively to an electric hand saw.

BACKGROUND OF THE INVENTION

Conventional power tools and in particular electric drills and cutters usually incorporate a chuck for releasably attaching an implement i.e. a drill bit or cutting blade. The chuck ought to be reasonably tight for holding the implement whilst quick to facilitate release and re-attachment of the implement. The design of chucks for drill bits have been well developed but that for cutting blades is found to be unsatisfactory in one way or another.

The subject invention seeks to provide an electric cutting tool that incorporates an improved chuck.

SUMMARY OF THE INVENTION

According to the invention, there is provided an electric cutting tool comprising a body having an end, a chuck at the end of the body for attaching a cutting implement having a rear end including a recess, and a drive mechanism including an electric motor in the body for driving the chuck to slide in reciprocation for operating said implement to cut. The chuck comprises an inner space for receiving the rear end of said implement, an internal multi-part fixing means for engaging the recess of said implement in the inner space, and an outer member having an inner cam surface for acting upon the fixing means. The outer member is manually movable between a locked position in which the cam surface presses the fixing means tight against said recess in the inner space to fix said implement and an unlocked position in which the fixing means is released.

Preferably, the fixing means is oblong, comprising an inner end for engaging the recess of said implement and an outer end for being acted upon by the cam surface.

In a preferred embodiment, the fixing means comprises an inner part for engaging the recess of said implement and an outer part for being acted upon by the cam surface, the two parts being discrete parts.

More preferably, the outer part of the fixing means is rollable while in contact with the cam surface upon the outer member being moved between the locked and the unlocked positions.

It is further preferred that the outer part of the fixing means is substantially spherical.

It is further preferred that the inner part of the fixing means is substantially spherical.

More preferably, the fixing means includes a third part positioned between the inner and the outer parts.

Further more preferably, the third part comprises a spring co-acting between the inner and the outer parts.

In a preferred embodiment, the chuck includes a tunnel extending across the inner space and the cam surface, and the fixing means is provided in the tunnel.

In a preferred embodiment, the chuck includes a tunnel extending across the inner space and the cam surface, and the inner and outer parts of the fixing means are provided in the tunnel, the tunnel having a cross-section wider than that of the outer part to permit side movement of the outer part.

Preferably, the outer member is annular and rotatable and has an inner surface including an arcuate ramp recessed therein which provides the cam surface.

Preferably, the chuck includes a core surrounded by the outer member, the core including a substantially central flat gap that defines the inner space.

It is preferred that the electric cutting tool is an electric hand saw.

BRIEF DESCRIPTION OF DRAWINGS

The invention will now be more particularly described, by way of example only, with reference to the accompanying drawings, in which.

DETAILED DESCRIPTION OF BEST MODE EMBODIMENT

Figure 1:
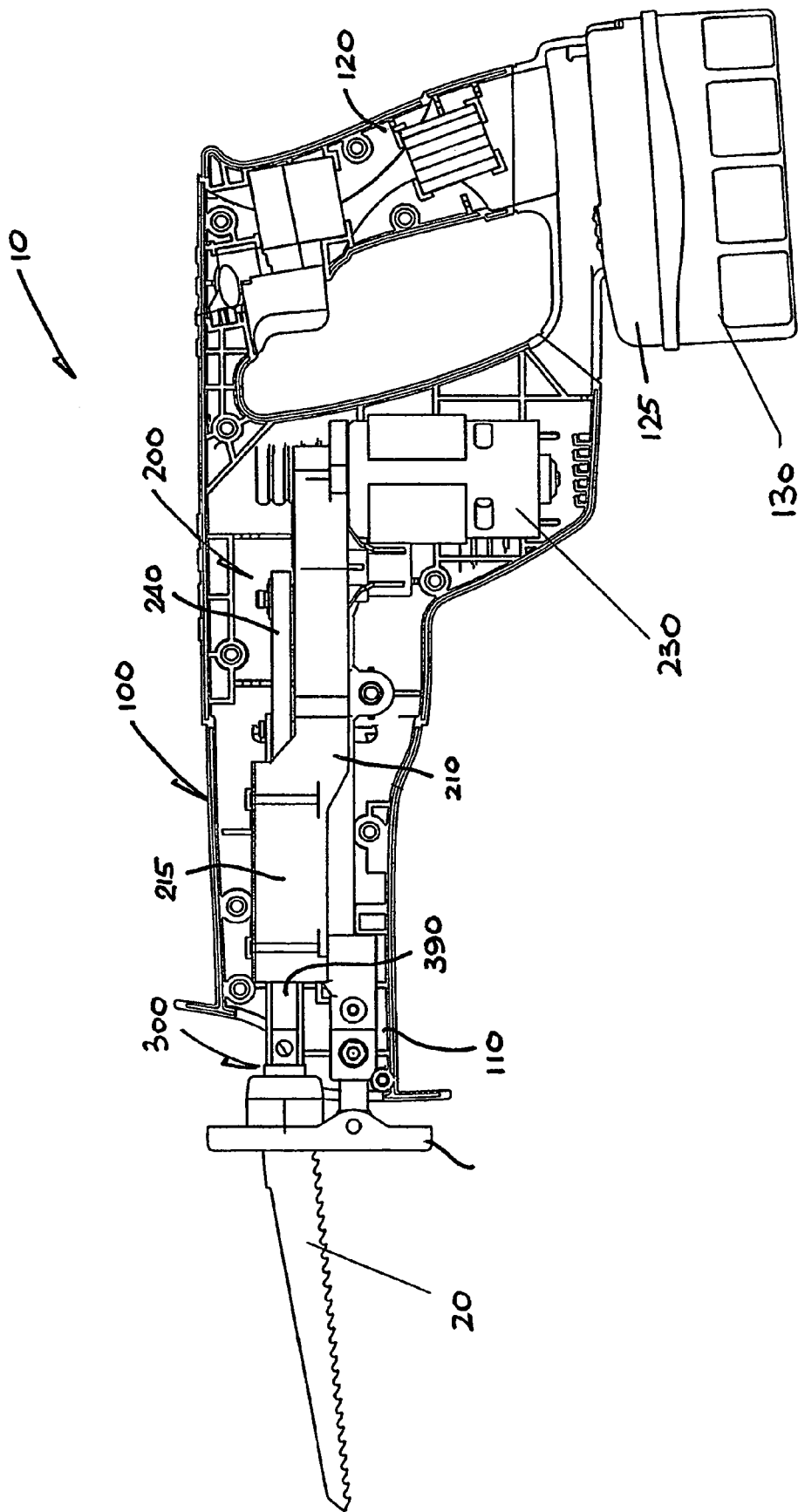
FIG. 1 is a cross-sectional side view of an embodiment of an electric cutting tool in accordance with the invention, that being an electric saw.
Figure 2:
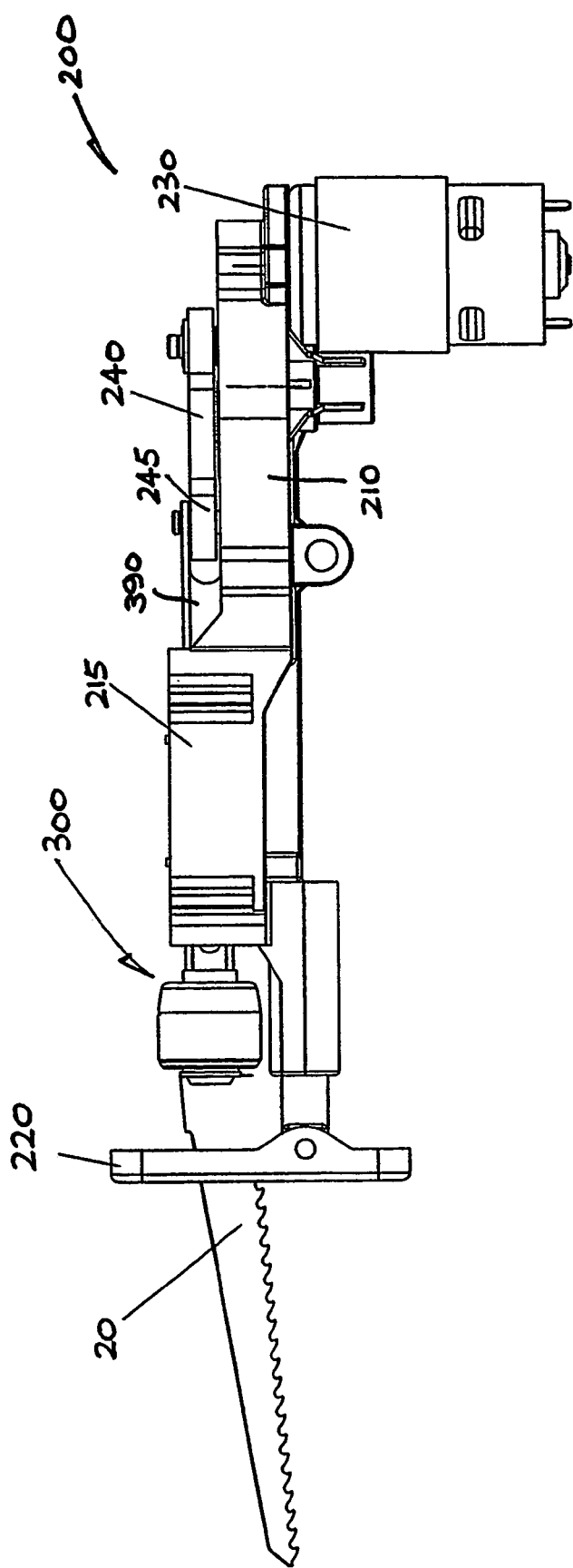
FIG. 2 is a side view corresponding to FIG. 1, which shows an internal drive mechanism of the electric saw.
Figure 3:
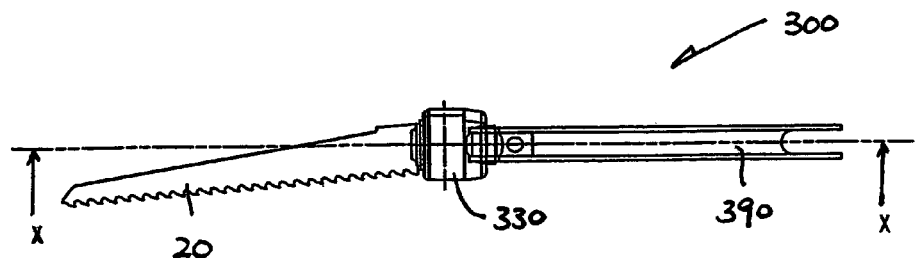
FIG. 3 is a side view corresponding to FIG. 2, which shows a chuck attaching a saw blade as part of the electric saw for being driven by the drive mechanism.
Figure 4:
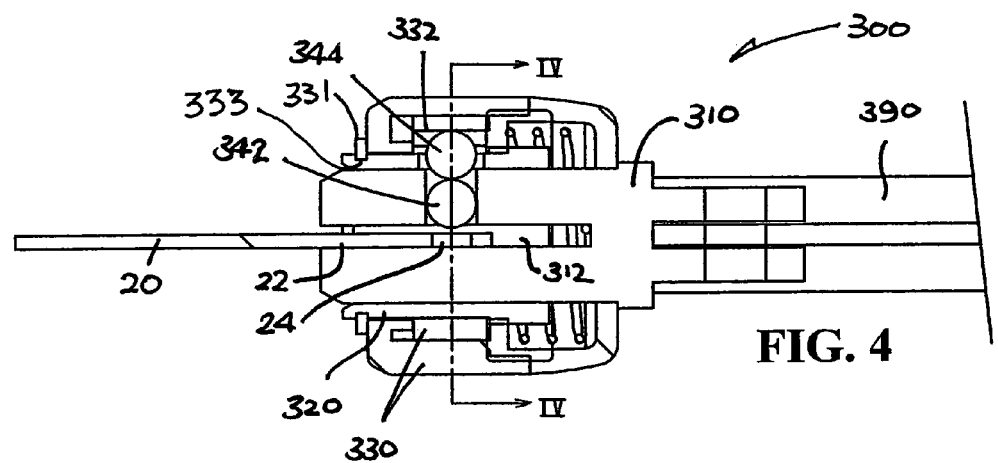
FIG. 4 is a cross-sectional view of the chuck with saw blade of FIG. 3 taken along line X—X.

Referring initially to FIGS. 1 to 4 and 4A and 4B of the drawings, there is shown an electric cutting tool in the form of an electric hand saw 10 embodying the invention, which comprises a horizontal elongate body casing 100 having a front end 110 from which a saw blade 20 extends and a rear end providing a looped handle 120. The handle 120 expands downwardly to form a bottom opening 125, to which a matching rechargeable battery pack 130 is attached. The electric saw 10 includes an internal drive mechanism 200 housed in the casing 100 for driving the saw blade 20 to slide back and forth for cutting, which is attached to the drive mechanism 200 by means of a chuck 300.

The drive mechanism 200 has a horizontal elongate frame 210 which supports an adjustable vertical guide plate 220 at its front end and an upright electric motor 230 at its rear end. As part of the drive mechanism 200, a gear train 240 mounted on the frame 210 and driven by the motor 230 serves to reduce the speed of the circular output of the motor 230 and includes a crank gearwheel 245 for translating the speed-reduced output into a rectilinear reciprocating motion. The frame 210 includes a co-extending channel 215 downstream of the crank gearwheel 245 for guiding the chuck 300, by a rear shaft 390 thereof extending through the channel 215, to slide back and forth in the longitudinal direction.

Figure 4A:
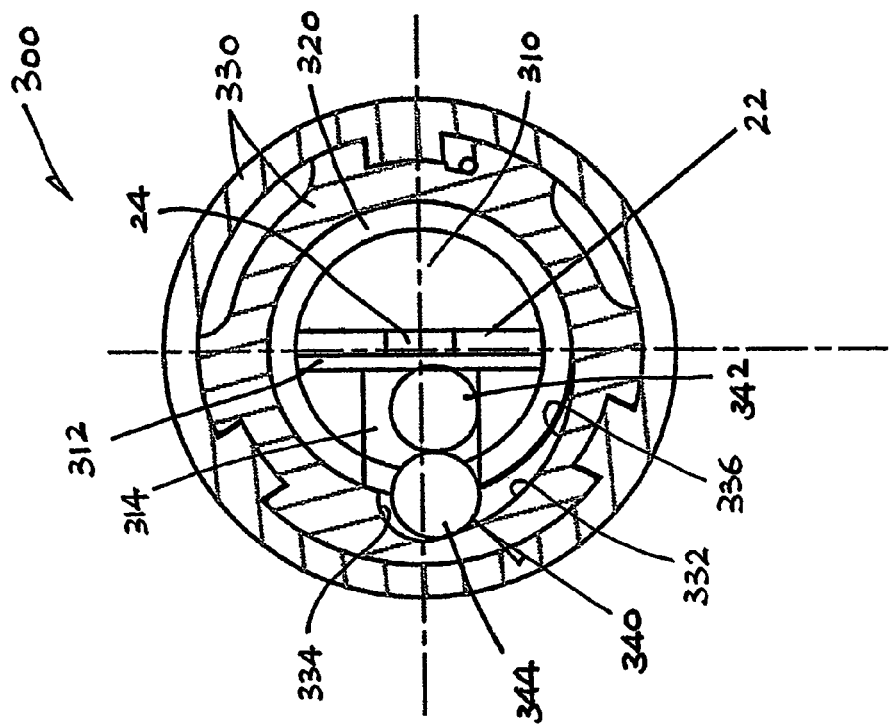
FIGS. 4A and 4B are cross-sectional views of the chuck with saw blade of FIG. 4 taken along line IV—IV, said chuck being in an unlocked and locked condition respectively.
Figure 4B:
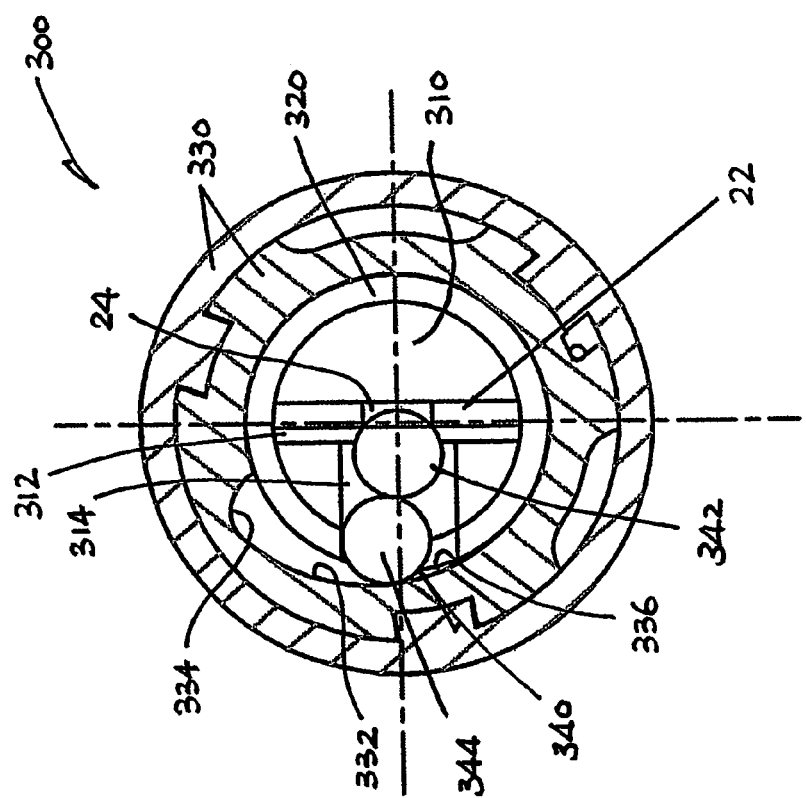

The main body of the chuck 300 has a cylindrical core 310 that is centrally bifurcated to form a vertical flat gap 312 for receiving and holding the saw blade 20 by its rear end 22 that includes a side recess or hole 24, and a cylindrical reinforcing tube 320 surrounding the core 310 tight. Also included is a double-layered outer cylinder 330 which surrounds the combined core 310 and tube 320 as a sliding fit for manual rotation or turning in opposite directions thereabout through an angle of about 90° between a locked position (FIG. 4B) and an unlocked position (FIG. 4A). The double-layered outer cylinder 330 is retained on the reinforcing tube 320 by a retaining ring 331 received in a circumferential groove 333 of the reinforcing tube 320 so that the double-layered outer cylinder is between the retaining ring 331 and the motor 230.

The combined core 310 and tube 320 is formed with a tunnel 314 that extends radially from one side of the gap 312 through to the interface between the tube 320 and the cylinder 330. The tunnel 314 contains an oblong two-part fixing means 340 which is provided by two discrete spherical components, i.e. an inner end ball 342 for engaging the hole 24 of the blade end 22 in the gap 312 and an outer end ball 344 for action by the cylinder 330.

The two balls 342 and 344 are free to roll independently, which when taken together are relatively longer than the tunnel 314 such that the outer ball 344 always protrudes partially out of the relevant end of the tunnel 314. Conversely, the tunnel 314 has an oblong cross-section which is relatively wider than the balls 342 and 344 in either direction of rotation of the cylinder 330 such that both balls 342 and 344 can move slightly sideways in the tunnel 314.

The cylinder 330 has a cam surface 332 in its inner surface, as provided by an arcuate ramp recessed in the inner surface, immediately outside the tunnel 314 for operating the fixing means 340 by pressing upon the outer ball 344. The cam surface 332 extends smoothly from a deep round end 334 through an angle of about 90° to terminate at a shallow flat end 336 tangential with the inner surface.

In the unlocked position of the cylinder 330 (FIG. 4A), the round cam end 334 is aligned with the tunnel 314 and provides adequate room accommodating the outer ball 344 loose. In particular, the outer ball 344 is not urged by the cam surface 332 against the inner ball 342, whereby the inner ball 342 is loose to permit withdrawal of the saw blade 20 and attachment of another blade.

Upon the cylinder 330 being turned to the locked position (FIG. 4B), the cam surface 332 gradually presses upon the outer ball 344 through a cam action and urges, with its flat end 336, the outer ball 344 against the inner ball 342. The inner ball 342 in turn engages and fixes the saw blade 20 tight by its rear hole 24 in the gap 312. When the cylinder 330 is turned in the opposite direction, the cam surface 332 recedes to release the outer and inner balls 344 and 342 hence the saw blade 20.

The interaction between the cylinder 330 (i.e. the cam surface 332) and the fixing means 340 (i.e. the outer ball 344) is facilitated and enhanced by the outer ball 344 being round and rollable. Upon tightening of the cylinder 330 into the locked position, the inclined cam surface 332 and the adjacent end wall of the tunnel 314 together form a slightly acute (slightly smaller than 90°) corner into which the outer ball 344 is being wedged in. The outer ball 344 is rollable, albeit only marginally, by the cam surface 332 into a tighter grip thereby, tighter than what would be achievable if the same end of the fixing means 340 were not rollable.

Upon loosening of the cylinder 330 from the locked position in the opposite direction, the outer ball 344 is rollable by the cam surface 332 back out of the wedging engagement. The outer ball 344 being rollable makes itself relatively easier to escape from the said wedging.

Figure 5:
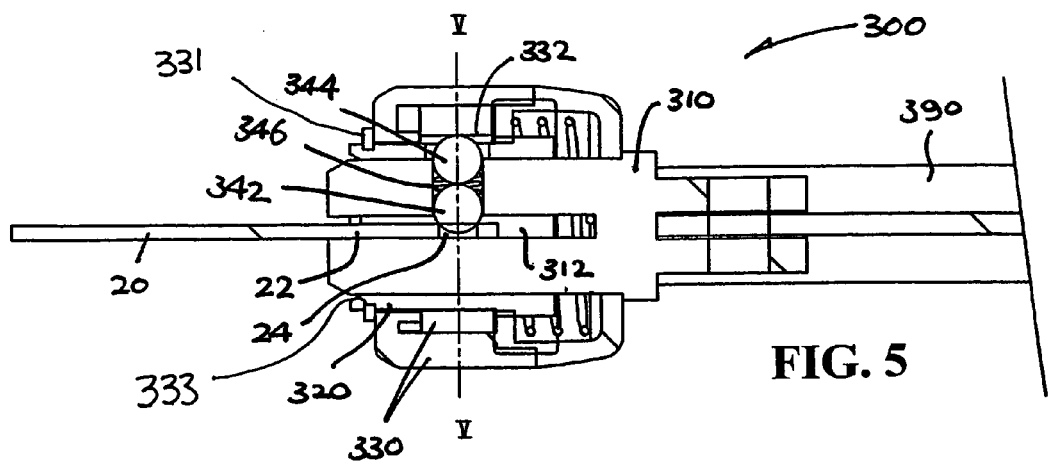
FIG. 5 is a cross-sectional view similar to FIG. 4, which shows a slightly different chuck attaching the same saw blade.
Figure 5A:
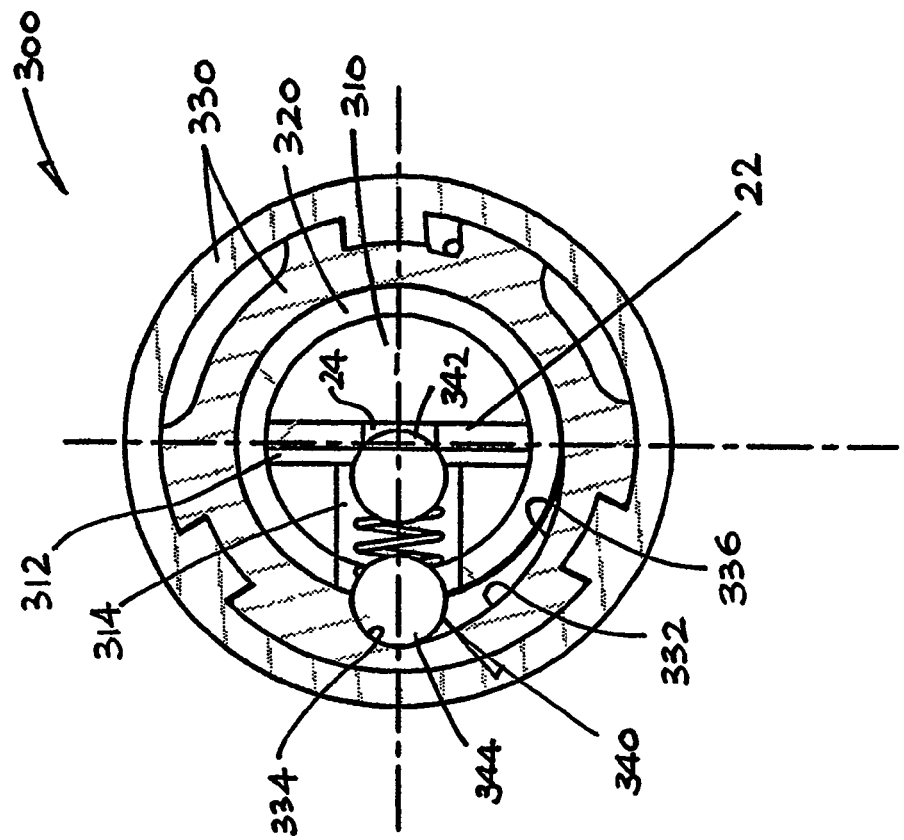
FIGS. 5A and 5B are cross-sectional views of the chuck with saw blade of FIG. 5 taken along line V—V, said chuck being in an unlocked and locked condition respectively.
Figure 5B:
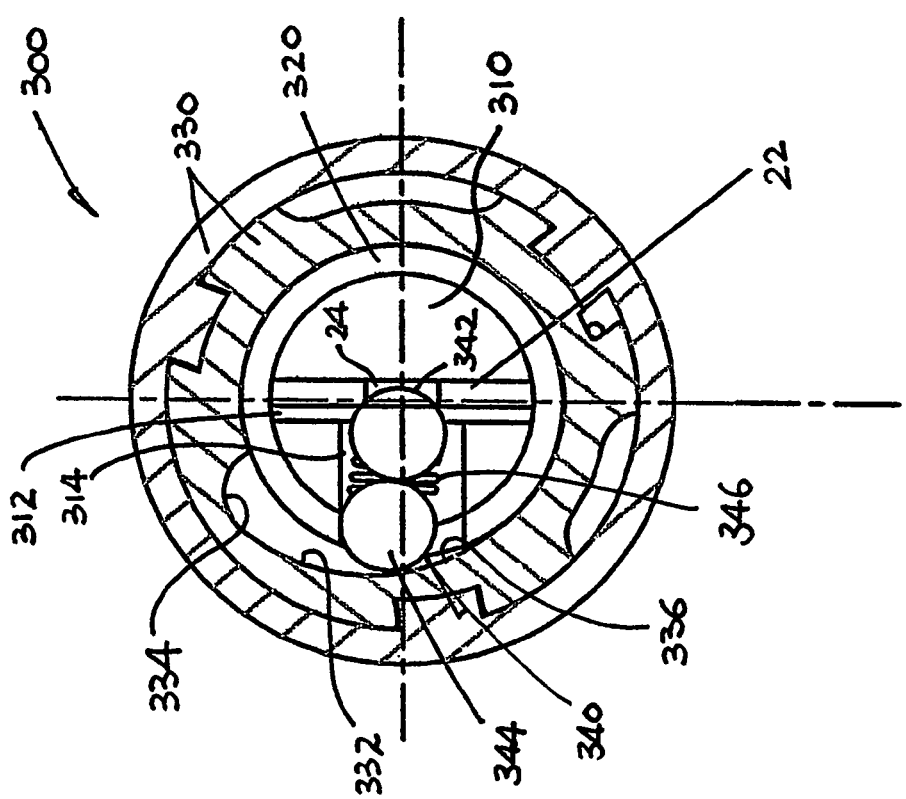

Reference is now made to FIGS. 5, 5A and 5B, which show a slightly different chuck 300 for the electric saw 10, with equivalent components designated by identical reference numerals. The second chuck 300 shares the same components as the first chuck 300 and operates in the same manner, though the fixing means 340 includes a third part positioned between the first and the second parts i.e. a compression coil spring 346 co-acting between the inner and the outer balls 342 and 344.

By reason of the spring 346, the two balls 342 and 344 are kept sprung at all time to avoid free rattling (FIG. 5A). The spring 346 is preferably weak to ensure that it does not add much resistance against rolling of the outer ball 344 by the cam surface 332 during locking and unlocking. In the locked condition, the two balls 342 and 344 abut directly with each other through the spring 346 (FIG. 5B). The balls 342 and 344 and spring 346 together act like a contractible/bendable locking pin, which as a whole 340 is deformable lengthwise and bendable sideways in a resilient manner as opposed to being in a freely loose manner as in the case of the previous counterpart.

It is envisaged that the fixing means 340 may comprise more than three parts, depending on the physical configuration e.g. the length of the tunnel. The outer end part 344 may not be spherical because it is believed that anything that is circular and rollable about its center, e.g. a disc, would work as described above. With regard to the inner end part 342, as no rolling is required, anything that has a round protrusion for engaging the end hole of a cutting blade can be used.

The invention has been given by way of example only, and various other modifications and/or variations to the described embodiment may be made by persons skilled in the art without departing from the scope of the invention as specified in the accompanying claims.

What is claimed is:

1. An electric cutting tool comprising:
   a body having an end;
   a chuck at the end of the body for attaching a cutting implement having a rear end including a recess or a hole; and
   a drive mechanism including an electric motor in the body for driving the chuck to slide in reciprocation for operating the cutting implement for cutting, wherein the chuck comprises:
   a cylindrical core including a slot for receiving the rear end of the cutting implement;
   a reinforcing tube surrounding and fixedly mounted on an outer surface of the core;
   fixing means for engaging the recess or hole of the cutting implement in the slot; and
   a double layer outer member surrounding and coaxial with the core and reinforcing tube and rotatable relative to the core and reinforcing tube, the outer member including an internal member having an interior cam surface acting upon the fixing means, and an external member engaging the internal member at an exterior surface of the internal member and an interior surface of the exterior member, the outer member being manually rotatable relative to the core and reinforcing tube between a locked position in which the interior cam surface presses the fixing means against the recess or hole of a cutting implement inserted into the slot to fix the cutting implement in place and an unlocked position in which the fixing means is released from the cutting implement.

2. The electric cutting tool as claimed in claim 1, wherein the fixing means comprises an inner end for engaging the recess or hole of the cutting implement, and an outer end acted upon by the interior cam surface.

3. The electric cutting tool as claimed in claim 1, wherein the fixing means comprises an inner part for engaging the recess or hole of the cutting implement and an outer part acted upon by the interior cam surface, the inner and outer parts being discrete parts.

4. The electric cutting tool as claimed in claim 3, wherein the outer part of the fixing means is rollable while in contact with the interior cam surface, when the outer member is rotated between the locked and unlocked positions.

5. The electric cutting tool as claimed in claim 3, wherein the outer part of the fixing means is substantially spherical.

6. The electric cutting tool as claimed in claim 3, wherein the inner part of the fixing means is substantially spherical.

7. The electric cutting tool as claimed in claim 3, wherein the fixing means includes a third part positioned between the inner and outer parts.

8. The electric cutting tool as claimed in claim 7, wherein the third part comprises a spring urging the inner and outer parts apart.

9. The electric cutting tool as claimed in claim 3, wherein the chuck includes a tunnel extending across the slot to the interior cam surface, and the inner and outer parts of the fixing means are located in the tunnel, the tunnel having a cross-section wider than the outer part, permitting side movement of the outer part.

10. The electric cutting tool as claimed in claim 1, wherein the chuck includes a tunnel extending across the slot and the interior cam surface, and the fixing means is located in the tunnel.

11. The electric cutting tool as claimed in claim 1, wherein the outer member is annular and rotatable and has an inner surface including an arcuate ramp recessed in the outer member as the interior cam surface.

12. The electric cutting tool as claimed in claim 1, being an electric hand saw.

13. The electric cutting tool as claimed in claim 1, wherein the reinforcing tube includes a circumferential groove positioned so that the outer member is between the groove and the electric motor and including a retaining ring located in the groove and retaining the outer member on the reinforcing tube.

* * * * *